United States Patent [19]

Runkle

[11] 4,373,614
[45] Feb. 15, 1983

[54] DISC BRAKE ASSEMBLY

[75] Inventor: Dean E. Runkle, LaPorte, Ind.

[73] Assignee: The Bendix Corporation, Southfield, Mich.

[21] Appl. No.: 248,652

[22] Filed: Mar. 27, 1981

[51] Int. Cl.³ .......................................... F16D 55/224
[52] U.S. Cl. .................. 188/72.3; 188/196 P
[58] Field of Search ............. 188/71.8, 72.3, 72.4, 188/79.5 GE, 196 P, 370

[56] References Cited

U.S. PATENT DOCUMENTS 3,186,521 6/1965 Chouings ..................... 188/71.8 X
3,277,983 10/1966 Jeffries ........................... 188/196 P Primary Examiner—Duane A. Reger
Attorney, Agent, or Firm—Paul David Schoenle; Ken C. Decker

[57] ABSTRACT

A disc brake assembly provides a caliper (22) cooperating with a pair of friction pads (16, 18) to brake a rotor (20). A piston assembly (28) is carried by the caliper 22 and is constructed from a pair of pistons (42, 42) and a resilient member 44. The pistons (40, 42) form an auxiliary pressure chamber (52) which cooperates with the resilient member (44) to control movement between the pair of pistons (40, 42).

9 Claims, 3 Drawing Figures

DISC BRAKE ASSEMBLY

The invention relates to a disc brake assembly wherein a caliper cooperates with a pair of friction pads to urge the latter into frictional engagement with a rotor during braking. The caliper receives a piston assembly which includes means to provide for retraction of the piston assembly upon termination of braking.

In a disc brake assembly a pair of friction pads are closely disposed relative to a rotor which is coupled for rotation with a wheel assembly of a vehicle. During braking the friction pads tightly engage the rotor to retard rotation of the latter. Upon termination of braking, the caliper and piston assembly relieve the force applied to the friction pads, however, the friction pads remain adjacent to the rotor. Without some device to space the friction pads from the rotor, the friction pads will drag on the rotor when the vehicle is moving. This drag inhibits free rolling of the rotor to reduce the efficiency of the vehicle in terms of miles per gallon consumed by the vehicle engine.

In the past a retraction seal, such as, illustrated in U.S. Pat. Nos. 3,377,076, Burnett, issued Apr. 9, 1968, and 3,421,604, Hobbs, issued Jan. 14, 1969, was provided between the caliper and piston assembly to retract the piston assembly upon termination of braking. Because of seal deformation during each brake application, the seal was subjected to wear so that after repeated application the seal was believed to lack the consistency desired for uniform retraction after each and every brake application. Also the seal was travel sensitive for the piston only so that caliper deflection was not compensated for by the seal.

Numerous other schemes with springs and automatic adjusting devices were tried to eliminate the drag characteristic of the disc brake assembly. It is believed that none of these devices were widely accepted by vehicle manufacturers for one reason or another.

The present invention provides a disc brake assembly, having a pair of friction pads which cooperate with a caliper assembly to retard rotation of a rotor during braking, the caliper assembly defining a bore for receiving a piston assembly and the piston assembly cooperating with the bore to substantially define a pressure chamber for receiving fluid pressure during braking, characterized by said piston assembly comprising a pair of pistons, said pair of pistons being movable relative to each other during braking and also during termination of braking, said pair of pistons cooperating to substantially define an auxiliary pressure chamber therebetween for receiving fluid pressure during braking and also to carry a resilient member therebetween, and said resilient member cooperating with the fluid pressure within said auxiliary pressure chamber to substantially control the relative movement between said pair of pistons.

It is an advantage of the invention that the pair of pistons are responsive to fluid pressure to control retraction of the piston assembly and the fluid pressure developed during braking is believed to more uniform than the travel imparted to the piston assembly.

It is a further advantage of the present invention that the piston assembly is formed by simple parts, namely two pistons and a sealing member, which are readily available components.

One way of carrying out the invention is illustrated in detail below with reference to the accompanying drawings which illustrate only one specific embodiment:

Figure 1:
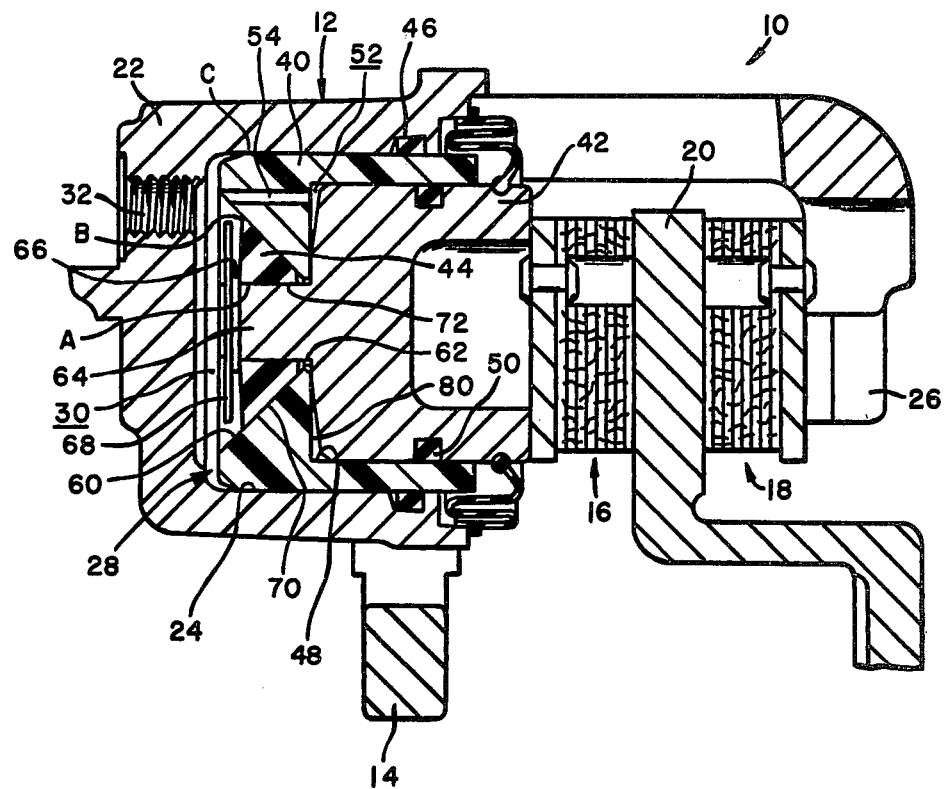
FIG. 1 is a cross-sectional view of a disc brake assembly in a rest position and constructed in accordance with the present invention.

In FIG. 1 a disc brake assembly is referred to in general as numeral 10. A caliper 12 is movably mounted on a support 14 by any suitable means such as pins or grooves formed with the support 14. The caliper cooperates with a pair of friction pads 16 and 18 to urge the latter into engagement with rotor 20. The caliper defines a housing 22 forming a bore 24 on one side of the rotor 20 and a leg 26 on the other side of the rotor 20. The bore 24 receives a piston assembly 28 which cooperates with the wall of the bore 24 to define a pressure chamber 30. Fluid pressure is communicated to the pressure chamber 30 via a port 32 during a brake application such that the piston assembly 28 moves toward the rotor 20 and the caliper reacts to the fluid pressure communicated to pressure chamber 30 to move opposite to the piston assembly 28. Consequently, the friction pads are urged into engagement with the rotor to retard rotation of the latter.

In accordance with the invention, the piston assembly 28 comprises a first piston 40 slidably disposed within the bore 24, a second piston 42 engageable with the friction pad 16 and a resilient member or grommet 44 cooperating with the pistons 40 and 42 in a manner described hereinafter. The first piston 40 sealingly engages a seal 46, which comprises a high friction seal, to substantially form the pressure chamber 30. A stepped bore 48 formed on the piston 40 extends through the piston 40 to movably receive the second piston 42. A seal 50 carried by the second piston 42 comprises a low friction seal and sealingly engages both pistons to substantially form an auxiliary pressure chamber 52. In order to communicate fluid pressure to the auxiliary pressure chamber 52, the first piston 40 defines a restricted passage 54 extending from the pressure chamber 30 to the auxiliary pressure chamber 52.

An annular tapered face 60 on the piston 40 leads to an opening 62 in common with the stepped bore 48. The piston 42 terminates away from the friction pad 16 in a stem 64 extending through the opening 62 into the pressure chamber 30. The resilient member 44 is carried on the stem 64 and an enlarged head 66 retains the resilient member 44 on the stem 64. The stem also carries a flange 68 opposing the resilient member 44 yet normally spaced therefrom. The resilient member 44 is substantially frusto-conical with an annular tapered edge 70 engaging the tapered surfaces 60 and an opening 72 receiving the stem 64. The stem 64 is larger in diameter than the opening 72, when the resilient member 44 is separated from the stem 64, so that the resilient member tightly engages the stem to form a sealing contact therewith.

In the preferred embodiment, the resilient member 44 extends radially outwardly from point A to point B, whereas the piston 40 is exposed to the pressure chamber 30 from point B to point C. In a 48 mm bore 24, the area covered by dimension A B on resilient member 44 is equal to 1002.77 square millimeters. The area covered by dimension B C on piston 40 is equal to 796.18 square millimeters. Consequently, the area covered by dimension B C is less than the area covered by dimension A B. The diameter of the restricted passage 54 is equal to 1.5748 millimeters and the diameter formed by the enlarged head 66 is about 14 millimeters and the ratio of the areas for passage 54 and port 32 is about one to four. In the rest position of FIG. 1, the gap formed between the flange 68 and the resilient member 44 is about 1.4 millimeters. And finally, the flange extends radially outwardly to about the restricted passage 68 but not overlapping the same.

Figure 2:
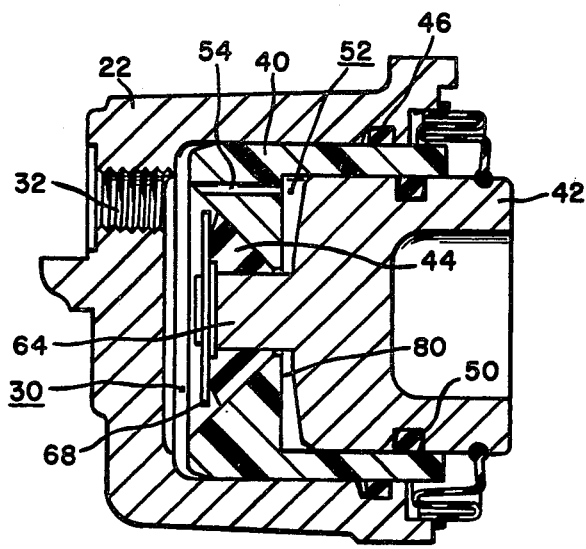
FIG. 2 is a view similar to FIG. 1 showing the disc brake piston assembly during an initial brake application.

In the rest position illustrated in FIG. 1, the resilient member 44 biases the piston 42 to abut the shoulder 80 formed by the stepped bore 48. The piston 42 is contacting the friction pad 16 which is slightly spaced from the rotor to provide a running clearance therewith. During braking, fluid pressure is initially communicated to the pressure chamber 30 at a fluid pressure level less than a stabilized level. The initial fluid pressure acts against the piston 40 exposed to chamber 30 to bias the piston 40 toward the rotor. Opposing the movement of the piston 40 is the high friction seal 46. Consequently, fluid pressure below a predetermined value will not cause the piston 40 to move. The initial fluid pressure within chamber 30 also acts against the stem 64 of the piston 42 to bias the latter toward the rotor 20. The resilient member 44 opposes movement of the piston 42 relative to the piston 40. The initial fluid pressure is further communicated via restricted passage 54 to the auxiliary pressure chamber 52 to bias the piston 42 toward the rotor. The low friction seal 50 imparts substantially less resistance to movement between the pistons 40 and 42 than does the high friction seal 46 impart for movement between piston 40 and caliper housing 22. Consequently, during initial braking, the fluid pressure acting against the stem 64 in pressure chamber 30 coupled with the fluid pressure acting against the piston 42 in auxiliary pressure chamber 52 causes the piston 42 to move relative to the piston 40 in the direction of the rotor 20. This initial movement of piston 42 is shown in FIG. 2 wherein the piston 42 biases the friction pad 16 (not shown) into engagement with the rotor 20 to take up any clearances. The caliper housing 22 may also move slightly toward the left in FIG. 2 to frictionally engage friction pad 18 (not shown) with rotor 20. In FIG. 2, the resilient member 44 is deformed because of the movement between the pistons to substantially fill the gap between the flange 68 and the resilient member.

Figure 3:
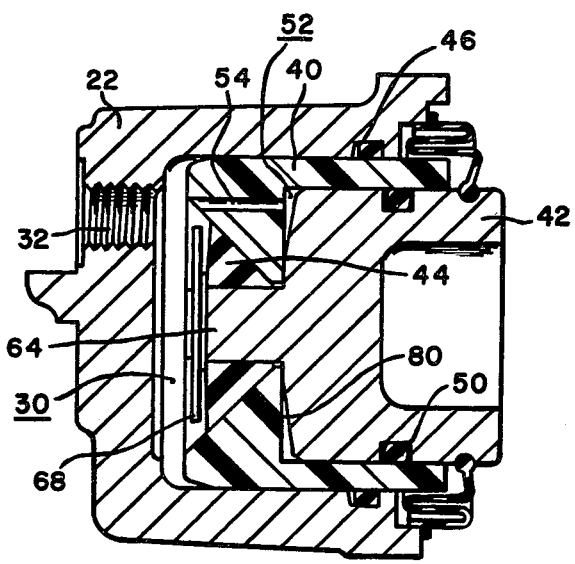
FIG. 3 is a view similar to FIG. 1 showing the disc brake piston assembly during a full brake application.

Continued braking increases the fluid pressure within the pressure chamber 30 so that the fluid pressure level is above the predetermined value. This higher fluid pressure is communicated to the auxiliary pressure chamber also to bias the piston 42 into full braking engagement with the rotor 20. As a result the caliper is urged to the left to also bias the friction pad 18 into full braking engagement with the rotor 20. In addition, the higher fluid pressure acts against an area of the piston 40 defined between the seals 46 and 50 to move the piston 40 so that shoulder 80 is again abutting the piston 42. In this condition the fluid pressure is substantially equal to the stabilized level so that full braking is accomplished. Full braking is shown in FIG. 3 wherein the piston 42 is tightly engaging the friction pad 16 (not shown) and the piston 40 is abutting the piston 42 via shoulder 80.

Upon termination of braking, the fluid pressure within pressure chamber 30 is communicated out through the port 32 to establish a first decay rate. Simultaneously, the fluid pressure within the auxiliary chamber 52 is communicated via restricted passage 54 to the pressure chamber 30 to establish a second decay rate. Because of the ratio of areas for port 32 and passage 54, the decay rate for pressure chamber 30 is substantially larger than for auxiliary pressure chamber 52. As a result the pressure chamber 30 is vented suddenly so that the force biasing piston 40 toward the rotor 20 is substantially reduced. Conversely, the fluid pressure within auxiliary chamber 52 is vented gradually so that a force on the piston 40 via the fluid pressure in auxiliary chamber 52 acting in a direction away from rotor 20 causes the piston 40 to move relative to the piston 42. Movement of the piston 40 initially upon termination of braking is also assisted by the restoring force of high friction seal 46. As the piston 40 moves away from the rotor relative to the piston 42, the auxiliary pressure chamber 52 is expanded and gradually vented to reduce the fluid pressure therein through restricted passage 54. The resilient member 44 is compressed to impart a restoring force to the piston 42 away from the rotor 2. Consequently at some predetermined pressure level within auxiliary pressure chamber 52, the piston 42 is biased via resilient member 44 to return to the position illustrated in FIG. 1 where the piston 42 is abutting the shoulder 80.

Because the telescoping movement of the pistons 40 and 42 is responsive to the fluid pressure communicated to the bore 24, it is believed that the deflection characteristics of the caliper housing will not affect the retraction of the piston assembly 28. Therefore, it is further believed that retraction will be more controlled than the state of the art which attempts to control the retraction of the piston via adjusters or high retraction seals which are primarily travel sensitive.

What is claimed is:

1. In a disc brake assembly having a pair of friction pads which cooperate with a caliper assembly to retard rotation of a rotor during braking, the caliper assembly defining a bore for receiving a piston assembly to substantially define a pressure chamber for receiving fluid pressure during braking, characterized by said piston assembly comprising a pair of pistons, said pair of pistons being movable relative to each other during braking and also during termination of braking, said pair of pistons cooperating to substantially define an auxiliary pressure chamber therebetween for receiving fluid pressure during braking and also cooperating to carry a resilient member therebetween, said resilient member cooperating with the fluid pressure within said auxiliary pressure chamber to substantially control the relative movement between said pair of pistons, a first seal cooperates with said pair of pistons to develop a first friction force when one of said pair of pistons is movable relative to the other piston a second seal cooperates with said other piston to develop a second friction force when said other piston is movable relative to said caliper assembly, and said first friction force is less than said second friction force.

2. The disc brake assembly of claim 1 in which one of said pair of pistons is engageable with one of said pair of friction pads, said other piston defining an opening extending from said pressure chamber to said auxiliary pressure chamber, said one piston including a stem extending through said opening, said stem cooperating with said other piston to carry said resilient member adjacent said opening and said resilient member substantially preventing fluid communication through said opening.

3. The disc brake assembly of claim 2 in which said stem terminates in a radially extending flange disposed within said pressure chamber, said flange being normally spaced from said resilient number and being engageable with said resilient member to limit the relative movement between said pair of pistons.

4. The disc brake assembly of claim 1 in which said resilient member defines a first radial dimension (A B) within said bore exposed to the fluid pressure within said pressure chamber and one of said pair of pistons defines a second radial dimension (B C) exposed to the fluid pressure within said pressure chamber and said second radial dimension (B C) is less than said first radial dimension (A B).

5. The disc brake assembly of claim 1 in which the pressure chamber receives fluid pressure through a port on said caliper assembly and one of said pair of pistons defines a passage communicating said auxiliary pressure chamber with said pressure chamber, the ratio of the areas defined by said passage and said port being substantially one to four, respectively.

6. The disc brake assembly of claim 1 in which said resilient member is substantially frusto conical in cross section with an opening extending therethrough, one of said pair of pistons including a portion extending through said opening and sealingly engaging the wall of said opening and said other piston defining a recess with a tapered surface engaging a tapered edge formed by the frusto conical resilient member.

7. The disc brake assembly of claim 1 in which one of said pair of pistons terminates in a radially extending flange disposed within the pressure chamber and opposing said resilient member, said other piston including at least one passage communicating said pressure chamber with said auxiliary pressure chamber, and said one passage is radially spaced from said flange whereby fluid communication through said one passage is independent from said flange.

8. In a disc brake assembly having a pair of brake shoes which are movably by a caliper assembly to a braking position, the caliper assembly defining a bore for movably receiving a piston assembly which cooperates with the caliper to define a pressure chamber for receiving fluid pressure during braking, characterized by said piston assembly comprising a pair of pistons, said pair of pistons cooperating to define an auxiliary chamber remote from said caliper and communicating with said pressure chamber via a controlled orifice, and said pair of pistons cooperating to carry a resilient member therebetween, said auxiliary chamber receiving fluid pressure during braking to substantially move one of said pistons relative to said other piston, said other piston moving during braking when the fluid pressure communicated to said pressure chamber is above a predetermined value, said other piston retracting within said bore upon termination of braking in response to the fluid pressure within said auxiliary chamber, said other piston moving relative to said one piston during retraction to load said resilient member, and said one piston retracting within said bore upon termination of braking in response to the load of said resilient member.

9. In a disc brake assembly, a caliper straddling a rotor to be braked, a pair of friction elements cooperating with the rotor to engage the latter during braking, a piston assembly carried by the caliper and cooperating with one of the pair of brake shoes to move the latter directly into engagement with the rotor during braking and the piston assembly cooperates with the caliper to define a fluid pressure chamber which receives fluid pressure during braking, characterized by said piston assembly comprising a first piston and a second piston, said caliper defining a recess for slidably and sealingly receiving said first piston, said first piston defining a bore for slidably and sealingly receiving said second piston, said pistons cooperating to define an auxiliary chamber communicating with said fluid pressure chamber via a restricted orifice and said pistons carrying a resilient member therebetween opposing movement therebetween in one direction, said auxiliary chamber receiving fluid pressure during braking to move said second piston initially during braking, said first piston moving relative to said second piston when the fluid pressure communicated to the fluid pressure chamber is above a predetermined value, said first piston retracting within said recess upon termination of braking in response to the fluid pressure remaining in said auxiliary chamber and said resilient member retracting said second piston within said bore when the fluid pressure within said auxiliary chamber is communicated to the fluid pressure chamber via said restricted orifice.

* * * * *